(12) United States Patent
Yamakita

(10) Patent No.: US 6,590,877 B1
(45) Date of Patent: Jul. 8, 2003

(54) DATA TRANSMISSION DEVICE

(75) Inventor: Tooru Yamakita, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/219,984

(22) Filed: Dec. 23, 1998

(30) Foreign Application Priority Data

Dec. 24, 1997 (JP) .............................................. 9-366401

(51) Int. Cl.$^7$ ................................................ H04Q 7/00
(52) U.S. Cl. ........................ 370/329; 370/252; 455/456
(58) Field of Search ................................ 370/359, 419, 370/911, 463, 329, 389, 401, 252, 352–356; 455/436, 456, 445

(56) References Cited

U.S. PATENT DOCUMENTS

| | | | | |
|---|---|---|---|---|
| 5,274,696 A | * | 12/1993 | Perelman | 379/89 |
| 5,752,191 A | * | 5/1998 | Fuller et al. | 455/445 |
| 5,809,424 A | * | 9/1998 | Eizenhoefer | 455/456 |
| 5,956,681 A | | 9/1999 | Yamakita | |
| 6,009,326 A | * | 12/1999 | Roder et al. | 455/436 |
| 6,115,608 A | * | 9/2000 | Duran et al. | 455/436 |
| 6,195,022 B1 | * | 2/2001 | Yamakita | 340/988 |
| 6,272,490 B1 | * | 8/2001 | Yamakita | 707/4 |

FOREIGN PATENT DOCUMENTS

| | | |
|---|---|---|
| EP | 0 448 076 A2 | 9/1991 |
| JP | 60-157363 | 8/1985 |
| JP | 06-121051 | 4/1994 |
| JP | 07-131535 | 5/1995 |
| JP | 08-293990 | 5/1996 |
| JP | 08-307940 | 11/1996 |

\* cited by examiner

Primary Examiner—Hassan Kizou
Assistant Examiner—John Pezzlo
(74) Attorney, Agent, or Firm—Frishauf, Holtz, Goodman & Chick, P.C.

(57) ABSTRACT

A data transmission device is provided which can transmit data directed to a specific individual to a terminal in the vicinity of the specific individual. When a transmission event of data occurs, position data table of terminals, which the specific individual has a possibility to use, on a network is searched to extract the position data which coincides with or is the closest to the position of the specific individual at a present time or at an arbitrary time point in a given time period including the present time. The data is transmitted to a terminal corresponding to the extracted position data. Therefore, data can be transmitted to a terminal which is located in the vicinity of a specific individual and immediate accessibility of data transmission can thereby be improved.

9 Claims, 9 Drawing Sheets

ADDRESS TABLE ⟵ 10

USER IDENTIFICATION CODE

MAIL: MAIL 1, MAIL 2, MAIL 3, · · ·
WEB: ADDRESS 1, ADDRESS 2, · · ·
TELEPHONE: TEL NUMBER 1, TEL NUMBER 2, TEL NUMBER 3, · · ·
FAX: FAX NUMBER a, FAX NUMBER b, FAX NUMBER c, · · ·
PAGER: ADDRESS a, ADDRESS b, · · ·
:

USER IDENTIFICATION CODE

MAIL: MAIL 1, MAIL 2, MAIL 3, · · ·
TELEPHONE: TEL NUMBER 1, TEL NUMBER 2, · · ·
:

FIG.4

POSITION TABLE 11

USER IDENTIFICATION CODE, USER POSITION DETECTION ADDRESS, POSITION DATA

TERMINAL a, TERMINAL a POSITION DETECTION ADDRESS, POSITION DATA, DATA FORM, ADDRESS, FIXED

TERMINAL b, TERMINAL b POSITION DETECTION ADDRESS, POSITION DATA, DATA FORM, ADDRESS, FIXED

TERMINAL c, TERMINAL c POSITION DETECTION ADDRESS, POSITION DATA, DATA FORM, ADDRESS, MOVILE

USER IDENTIFICATION CODE, USER POSITION DETECTION ADDRESS, POSITION DATA

TERMINAL x, TERMINAL x POSITION DETECTION ADDRESS, POSITION DATA, DATA FORM, ADDRESS, FIXED

TERMINAL y, TERMINAL y POSITION DETECTION ADDRESS, POSITION DATA, DATA FORM, ADDRESS, FIXED

TERMINAL z, TERMINAL z POSITION DETECTION ADDRESS, POSITION DATA, DATA FORM, ADDRESS, MOVILE

FIG.5

DATA ANALYSIS TABLE 12

USER IDENTIFICATION CODE
---
TRANSMITTER: aab, cac, · · ·
KEYWORD: XXY, XXZ, · · ·

⋮

USER IDENTIFICATION CODE
---
TRANSMITTER: iij, pqr, · · ·
KEYWORD: UVS, UVW, · · ·

DATA TRANSMISSION DEVICE

BACKGROUND OF THE INVENTION

The present invention relates to a data transmission device and particularly, to a data transmission device which transmits data such as text data, image data, speech data or the like, to a data reproducing terminal (hereinafter simply referred to as terminal) such as a telephone terminal, a facsimile terminal, an electronic mail terminal, a radio pager (a so-called pocket bell) or the like, which is present on a network of LAN, WAN, wire communication, wireless communication or a combination thereof, through the network.

This application is based on Japanese Patent Application No. 9-366401, filed Dec. 24, 1997, the content of which is incorporated herein by reference.

Data forms communicated through a network have, in recent years, included a variety of kinds of data such as speech data at a telephone terminal and image data at a facsimile terminal. Other kinds of communicated data include text data used in electronic mail and a radio pager. Also, the kinds of terminals used in daily life have been progressively increasing.

Every terminal has unique identification data effective within the same network. A line number of a telephone terminal is a typical example thereof. When a telephone number is transmitted through a network, a necessary line route for call communication is established by one or more exchange systems and speech data can thus be exchanged between specified terminals. In the case of terminals on a LAN (local network), each terminal has a unique node data such as an Ethernet address or an IP (Internet protocol) address, and the data can be transmitted to a specified terminal by transmitting data with attachment of the node data thereof.

According to the above described conventional technique, however, a receiver address of data is determined using unique identification data exclusively assigned to each terminal. Accordingly, for example, when a specific individual to whom the data is to be transmitted is not available near a receiver terminal thereof, the specific individual cannot access the data at the same time when the data is transmitted to the terminal. Hence, a problem of being poor in regard to immediate accessibility of transmission occurs.

If such circumstances are expressed in a metaphor, the above described technique can be said to be a post office box in a postal service. The reason why is as follows: While a position of a post office box is fixed, a specific individual who owns the post office box is present in a different place other than the post office box and in addition, is constantly on the move in a great part of the day. Therefore, if the specific individual does not access the post office for confirmation in a positive way, the specific individual cannot know the delivery of the data at all.

BRIEF SUMMARY OF THE INVENTION

Accordingly, it is an object of the present invention to provide a data transmission device in which it is possible that a terminal which is near a specific individual is selected and data is transmitted to the selected terminal, thus improving immediate accessibility of transmitted data.

According to the present invention, there is provided a data transmission device which transmits data to a predetermined individual via a network, comprising first storage means for storing individual position data indicating a position of the predetermined individual at a present time or at an arbitrary time point in a given time period including the present time; second storage means for storing terminal position data of terminals on the network, each of which the predetermined individual has a possibility to use; means for extracting such terminal position data from the second storage means that coincides with or is the closest to the individual position data stored in the first storage means; means for selecting a terminal having the extracted terminal position data and transmitting means for transmitting data to the terminal selected by the selecting means.

The data transmission device further comprises first updating means for requesting transmission of individual position data from a first position detector which the specific individual has and updating the individual position data stored in the first storage means based on the individual position data transmitted from the first position detector; and second updating means for requesting transmission of terminal position data from second position detectors attached to all the terminals, each of which the specific individual has a possibility to use, on the network, and updating the terminal position data stored in the second storage means based on the terminal position data transmitted from the second position detectors.

According to the present invention, there is provided another data transmission device which transmits data to a specific individual via a network, comprising first means for determining whether a transmitter of the data is a predetermined transmitter; second means for determining whether a predetermined keyword is included in the data; and means for transmitting the data to a predetermined terminal on the network when the first means determines that the transmitter of the data is the predetermined transmitter or when the second means determines that the predetermined keyword is included in the data.

The other data transmission device further comprises first storage means for storing individual position data indicating a position of the specific individual at a present time or at an arbitrary time point in a given time period including the present time; second storage means for storing terminal position data of all terminals on the network, each of which the specific individual has a possibility to use; selecting means for selecting a terminal of which terminal position data coincides with or is the closest to the individual position data stored in the first storage means; and transmitting means for transmitting data to the terminal selected by the selecting means.

According to the present invention, there is provided a further data transmission device which transmits data to a specific individual via a network, comprising storage means for storing use schedules of all terminals on the network, each of which the specific individual has a possibility to use; selecting means for selecting a terminal which is assumed to be used by the specific individual with reference to the use schedules stored in the storage means when a transmission event occurs; and transmitting means for transmitting data to the terminal selected by the selecting means.

The transmitting means transmits the data to a terminal other than the selected terminal when the selected terminal cannot receive the data.

The transmitting means in the above data transmission devices comprises means for comparing a data form of transmitting data and a data form which can be processed by the selected terminal; and means for converting the data form of the transmitting data into a data form which can be processed by the selected terminal when the comparing means detects noncoincidence.

According to the present invention, there is provided a computer readable program comprising program code for storing individual position data indicating a position of the predetermined individual at a present time or at an arbitrary time point in a given time period including the present time to first storage means; program code for storing terminal position data of terminals on the network to second storage means, each of which the predetermined individual has a possibility to use; program code for extracting such terminal position data from the second storage means that coincides with or is the closest to the individual position data stored in the first storage means; program code for selecting a terminal having the extracted terminal position data; and program code for transmitting data to the selected terminal.

The program further comprises program code for requesting transmission of individual position data from a first position detector which the specific individual has and updating the individual position data stored in the first storage means based on the individual position data transmitted from the first position detector; and program code for requesting transmission of terminal position data from second position detectors attached to all the terminals, each of which the specific individual has a possibility to use, on the network, and updating the terminal position data stored in the second storage means based on the terminal position data transmitted from the second position detectors.

According to the present invention, there is provided another computer readable program comprising program code for determining whether a transmitter of data is a predetermined transmitter; program code for determining whether a predetermined keyword is included in the data; and program code for transmitting the data to a predetermined terminal on the network when it is determined that the transmitter of the data is the predetermined transmitter or when it is determined that the predetermined keyword is included in the data.

The program further comprises program code for storing individual position data indicating a position of the specific individual at a present time or at an arbitrary time point in a given time period including the present time into first storage means; program code for storing terminal position data of all terminals on the network, each of which the specific individual has a possibility to use into second storage means; program code for selecting a terminal of which terminal position data coincides with or is the closest to the individual position data stored in the first storage means; and program code for transmitting data to the selected terminal.

According to the present invention, there is provided a further computer readable program comprising program code for storing use schedules of all terminals on the network, each of which the specific individual has a possibility to use into storage means; selecting means for selecting a terminal which is assumed to be used by the specific individual with reference to the use schedules stored in the storage means when a transmission event occurs; and program code for transmitting data to the selected terminal.

According to the present invention, the data can be transmitted to a terminal which is located in the vicinity of a specific individual and immediate accessibility of data transmission can thereby be improved.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

Preferred embodiments of a data transmission device according to the present invention will now be described with reference to the accompanying drawings.

First Embodiment

A data transmission device which transmits image data to a facsimile terminal connected to a telephone line network is described as the first embodiment.

Figure 1:
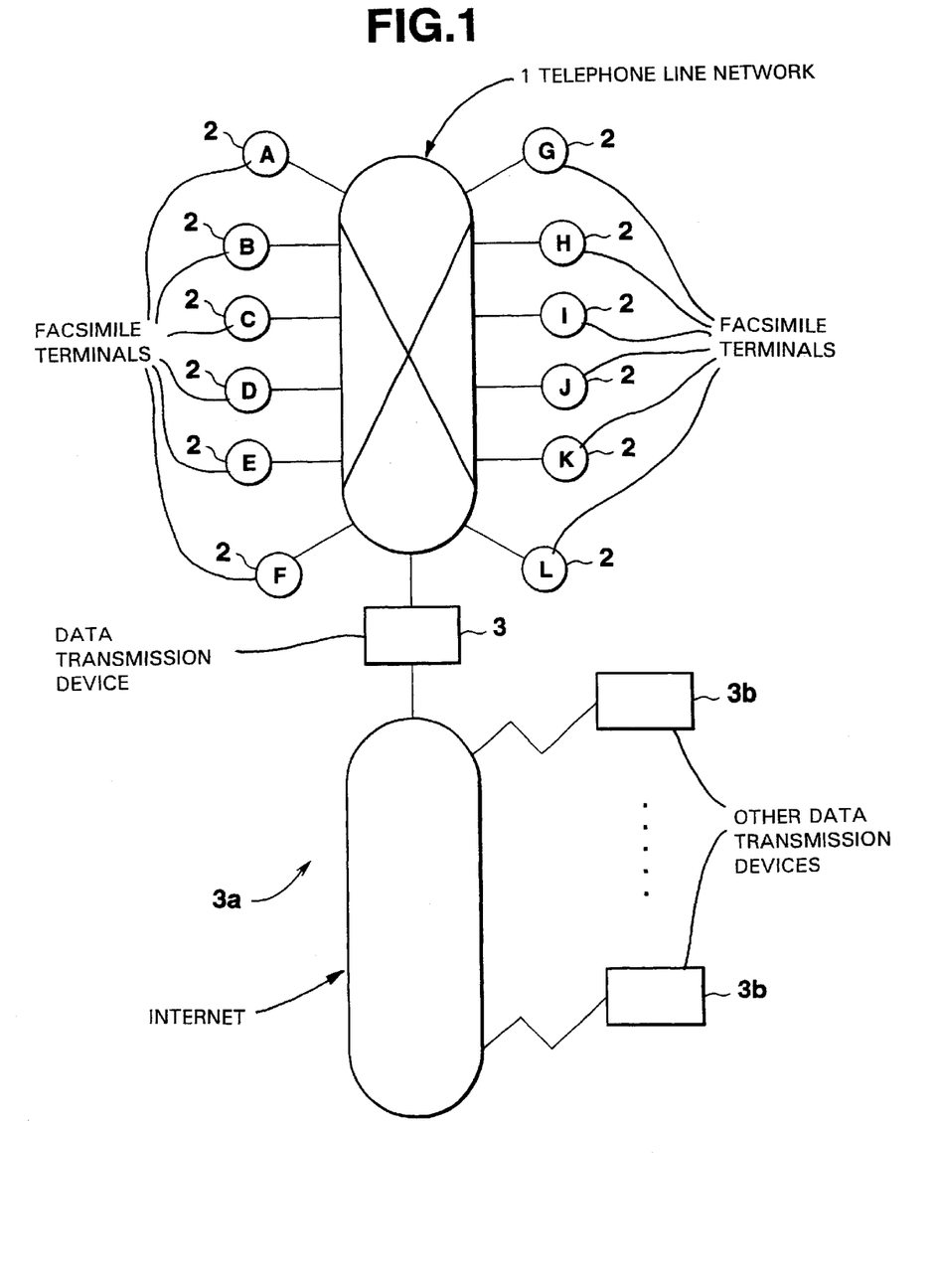
FIG. 1 is a block diagram showing a configuration of a telephone line network in first and second embodiment.

FIG. 1 shows a telephone line network 1. The telephone line network 1 includes a wire communication network, a wireless communication network, a satellite communication network or a mixed communication network thereof, which are intended for commercial use or private use, and a plurality of exchange systems, which establishes a route between arbitrary terminals while freely combining the networks, and forms a network for transmitting data.

The telephone line network 1 is connected to, in addition to many telephone terminals and various kinds of data processing terminals, both not shown, which are connected to the network 1, many facsimile terminals 2 and a data transmission device 3 which can transmit data (in this case, image data) directed to a specific individual to at least one of the facsimile terminals 2. The data transmission device 3 functions as a center device connected to a network such as the telephone line network 1. Data transmitted from a terminal is sent to another terminal through the network and by way of the center device. Data generated by various kinds of data services at the center device is also transmitted to a terminal through the network.

As shown in FIG. 1, reference symbol 3a represents another network such as the Internet, and reference symbols 3b represent other data transmission devices.

The respective facsimile terminals 2 here are assigned with unique identification data within the same network, as has been described in the background of the invention. While generally, the identification data is line numbers, single alphabetical letter is used in the embodiment. In other words, facsimile terminals shown in the figure are respectively assigned with "A" to "L" as identification data.

The case where data directed to a person (a specific individual) is transmitted from the data transmission device 3 will be considered. When a facsimile terminal 2 which has a possibility for the specific individual to use is always determined, transmission of the data is simple. For example, if the facsimile terminal 2 with an identification data "A" (hereinafter referred to as terminal "A") is a receiver terminal, it is only required that the identification data "A" is sent onto the telephone line network 1 to establish a route between the data transmission device 3 and the terminal "A", and thereafter data is sent.

When there are available a plurality of facsimile terminals 2, each of which has a possibility for the specific individual to use, for example when there are a facsimile terminal 2 with an identification data "D" (hereinafter referred to as terminal "D") installed at the individual's office, a facsimile terminal 2 with an identification data "G" (hereinafter referred to as terminal "G") installed at the home and a facsimile terminal 2 with an identification data "J" (hereinafter referred to as terminal "J") installed at a customer where the individual at times visits, these terminals "D", "G", "J" are required to be intentionally selected before transmission, which is not only cumbersome but extremely difficult for a person who is frequently out of office, especially such as responsible for a sales activity.

Figure 2:
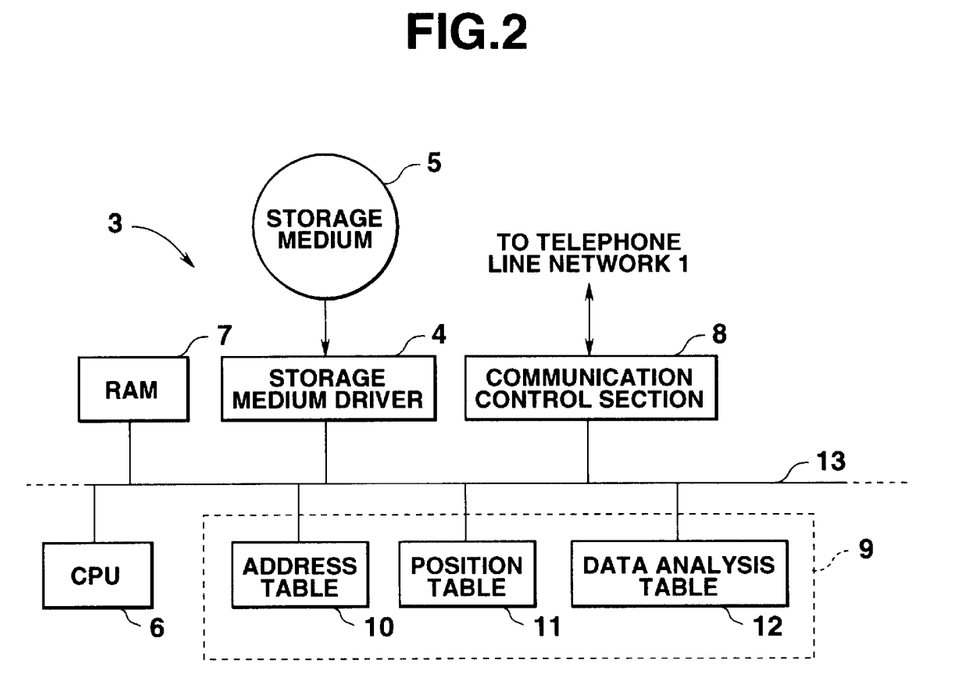
FIG. 2 is a block diagram schematically showing a structure of a data transmission device of the first and second embodiments.

FIG. 2 is a schematic block diagram of a data transmission device 3 of the embodiment. The data transmission device 3 comprises CPU (a central processing unit) 6 which executes a program which is fetched from a storage medium 5, portable or installed, through a storage medium driver 4 under control of a specific OS (an operating system); RAM (a random access memory) 7 which constitutes a memory space for executing the program; a communication control section 8 which interfaces with the telephone line network 1 outside the block diagram of the figure; tables (in the figure, an address table 10, a position table 11 and an data analysis table 12) which are formed in a memory device 9 such as a hard disk; and a bus 13 on which data transfer is effected between sections.

In the figure, while the tables 10, 11, 12 are respectively connected to the bus 13, this is for convenience in presentation. There is only one physical connection of the bus 13 to the storage device 9.

Figure 3:
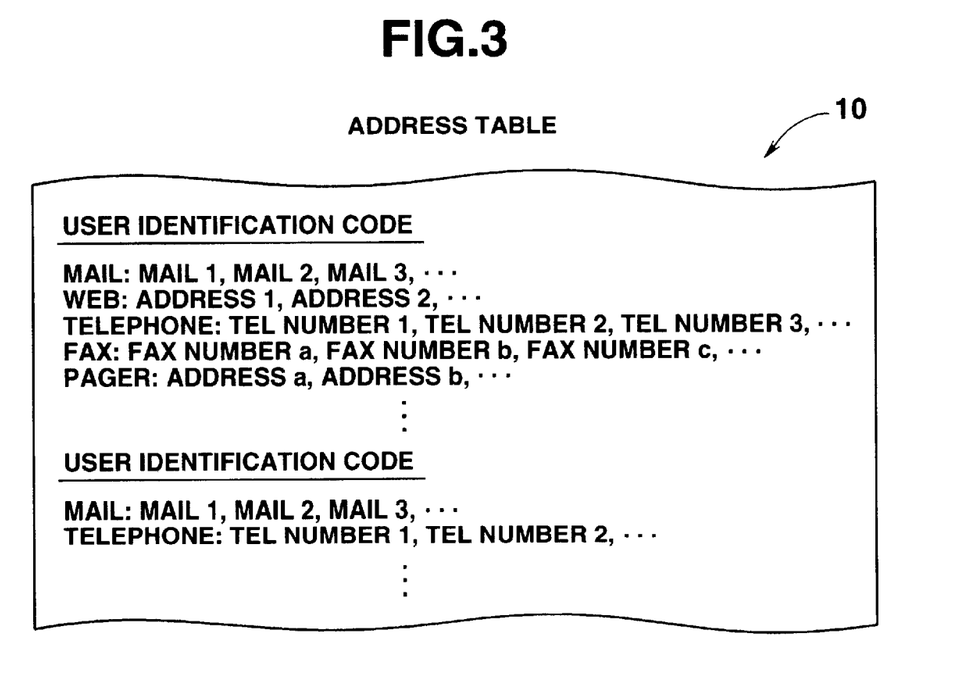
FIG. 3 is a representation of a structure of an address table.

Structures of the tables 10, 11, 12 will be described. FIG. 3 is a representation of a structure of the address table 10. The address table 10 comprises a plurality of records for respective users (who each have a right of use to the facsimile terminal 2). Each record has a plurality of fields for respective kinds of terminal under each user identification code and each of the field has a structure in which at least one address field is included.

The address table 10 shown in the figure comprises fields which are respectively named as mail, Web, telephone, FAX and pager (hereinafter referred to as mail field, Web field, telephone field, FAX field and pager field), but this is the best mode for accepting all kinds of terminals suitable for the data form of data (a text, an image, speech or the like). When the facsimile terminals 2 are a single object for receiving data, only a FAX field may be provided.

In FIG. 3, MAIL 1, MAIL 2, MAIL 3, . . . of the mail field are sub-fields which accommodate respective address fields of mail terminals each of which a user of the record has a possibility to use. Likewise, ADDRESS 1, ADDRESS 2, . . . of the Web field are sub-fields which accommodate respective address fields of browser terminals each of which the user has a possibility to use, NUMBER 1, NUMBER 2, NUMBER 3, . . . of the telephone field are sub-fields which accommodate respective address fields of telephone terminals each of which the user has a possibility to use, NUMBER a, NUMBER b, NUMBER c, . . . of the FAX field are sub-fields which accommodate respective address fields of facsimile terminals each of which the user has a possibility to use and ADDRESS a, ADDRESS b, . . . of the pager field are sub-fields which accommodate respective address fields of pager terminals each of which the user has a possibility to use.

The address table 10 which has such a structure is provided according to necessity for specifying a user identification code which is required for referring to the position table 11, described below, based on a receiver address of a transmission event when the transmission event of data directed to a specific individual has occurred in the center device 3 in the network 1 or by transmission to the center device 3 from a third party which is connected with the network 1.

Figure 4:
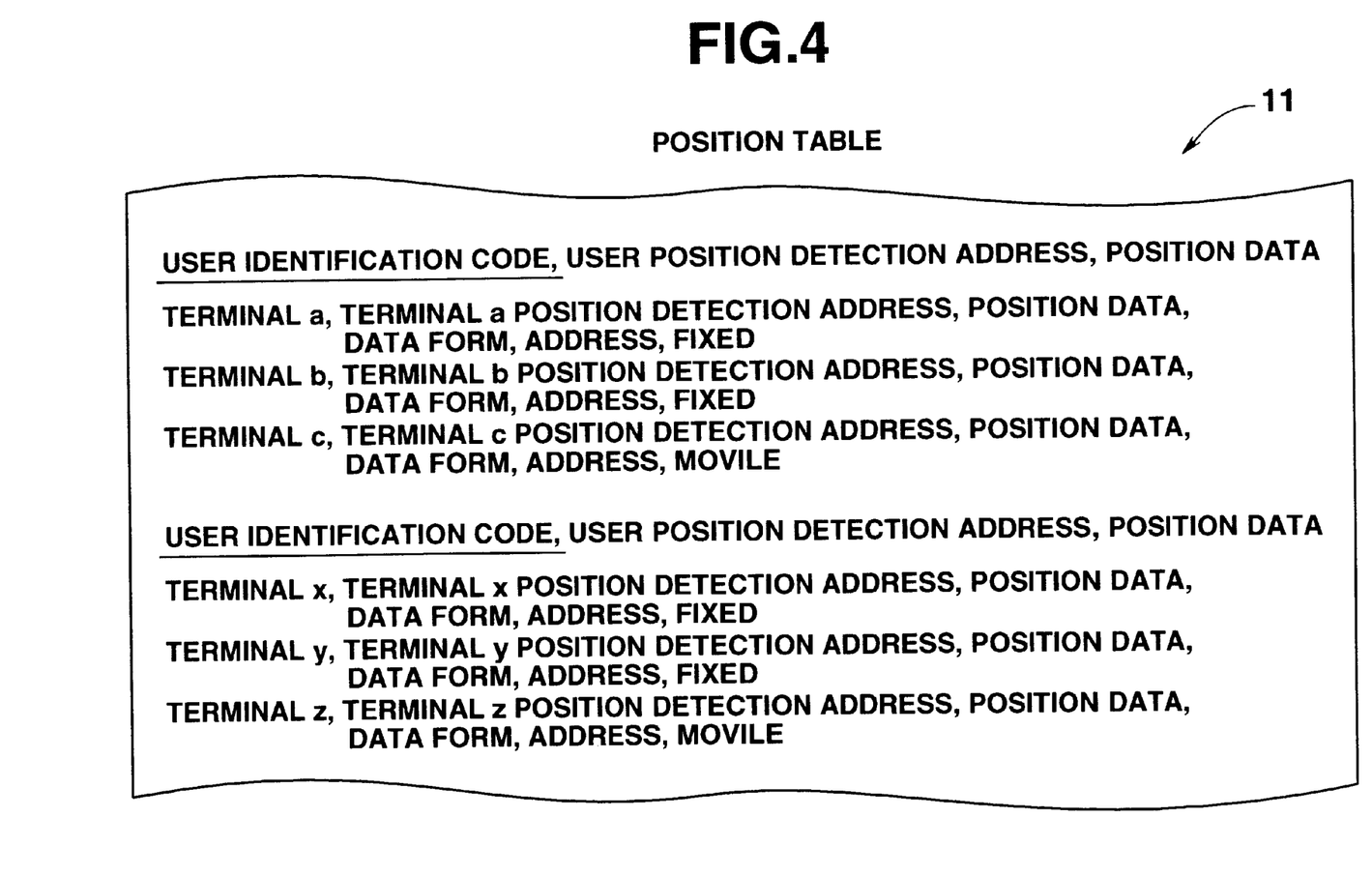
FIG. 4 is a representation of a structure of a position table.

FIG. 4 is a representation of a structure of the position table 11. The position table 11 comprises a plurality of records for respective users and the records can respectively be referred by user identification codes in an individual manner and at the same time, each record comprises all terminal fields which a user can use. Each of the terminal fields has a structure in which data such as a position detection address of the terminal, position data of the terminal, a data form processible by the terminal, an address of the terminal and distinction on whether the terminal is portable or installed (distinction between a fixedly installed terminal and a transportable, carried terminal) are included and in addition, each record includes a position detection address of the user and position data of the user. A fixedly installed terminal among the terminals does not necessarily require detection of its position but the position data thereof may be stored on the center side in advance. In this case, when an installation place of a terminal is changed, a position data of the terminal in the position table 11 is freely rewritten by an instruction from the terminal.

A position detection address here is identification data of a position detector which is carried by a user or attached to each terminal and, for example, when a well known position search terminal to which a PHS technology is applied is used as a position detector, an address of the position search terminal is the position detection address.

Incidentally, the position search terminal is a device which measures electric field strengths from respective PHS base stations and transmits the data to a position data management center and the present position coordinates (a latitude and a longitude, or the like) of the position search terminal are achieved by a principle of a triangulation technique in the position data management center.

Accordingly, only if a position detection address (a position detection address of a user or a position detection address of a terminal) is sent to a PHS base station, the present position of a specific position search terminal, that is the present position of a user who carries the position search terminal or a terminal which is equipped with the position search terminal, can correctly be known. Each item of position data of the position table 11 is updated. In this case, the position detector may be GPS.

Since the above exemplified position search terminal is equipped with a push-button for noticing a self-position, the self-position is noticed to the data transmission device 3 through the position data center by pressing down the button, whereby a position data of the position table 11 may be updated. Selecting operations using the above described two tables (the address table 10 and the position table 11) are described as follows.

When a transmission event of data directed to a specific individual occurs, the address table 10 is referred to according to address data thereof and a user identification code of the specific individual corresponding to the address is determined. For example, when a data form of a transmission event which has occurred is that of a transmission event to a facsimile terminal, a number in a sub-field of a FAX field is read and it is sequentially searched whether or not the number correspond to the address of the transmission event which has occurred. When a corresponding number has been detected, a user identification code which is set for this address is selected. Then, a device name of a specific terminal, that is a device name of a terminal which coincides with a user position data or which is the closest to the user position data is selected from the record of the selected user identification code in the position table 11.

Therefore, according to the embodiment, since a terminal which is located in the vicinity of a specific individual is selected and data can be transmitted to the terminal, the embodiment can achieve an advantageous effect, which, heretofore, has not been able to be achieved, and which enables immediate accessibility of data transmission to be improved.

While, in the above described embodiment, a terminal is constantly selected in agreement with the movement of a specific individual, since there is a case where urgency is not required depending on contents of data, some waste is unavoidable in a selection operation. The data analysis table 12 is used for determination on whether or not a selection operation is performed.

Figure 5:
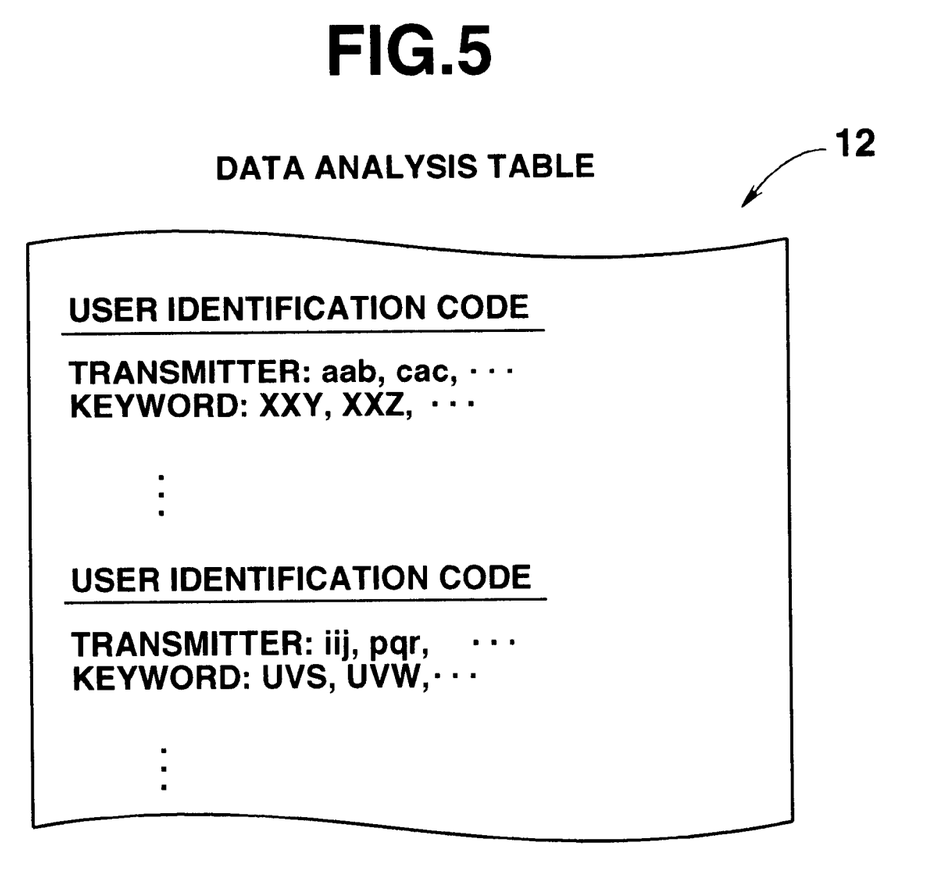
FIG. 5 is a representation of a structure of an data analysis table.

FIG. 5 is a representation of a structure of the data analysis table 12 and in each user record of the table, transmitter data which requires urgency, a keyword of an electronic text which requires urgency and the like are stored. Only when there arise coincidence with a transmitter or a keyword thereof, a terminal located in the vicinity of a specific individual is selected and the data is sent to the selected terminal, whereby waste in processing is eliminated and efficiency of the system can be improved. The address table 10, position table 11 and data analysis table 12 of a user corresponding to the user identification code are called out to a user terminal with designation by the user and the user can correct, add or delete them in an arbitrary manner. As an alternate, items which is to be corrected, added or deleted are transmitted to the center device by means of an electronic mail or the like for updating.

Figure 6:
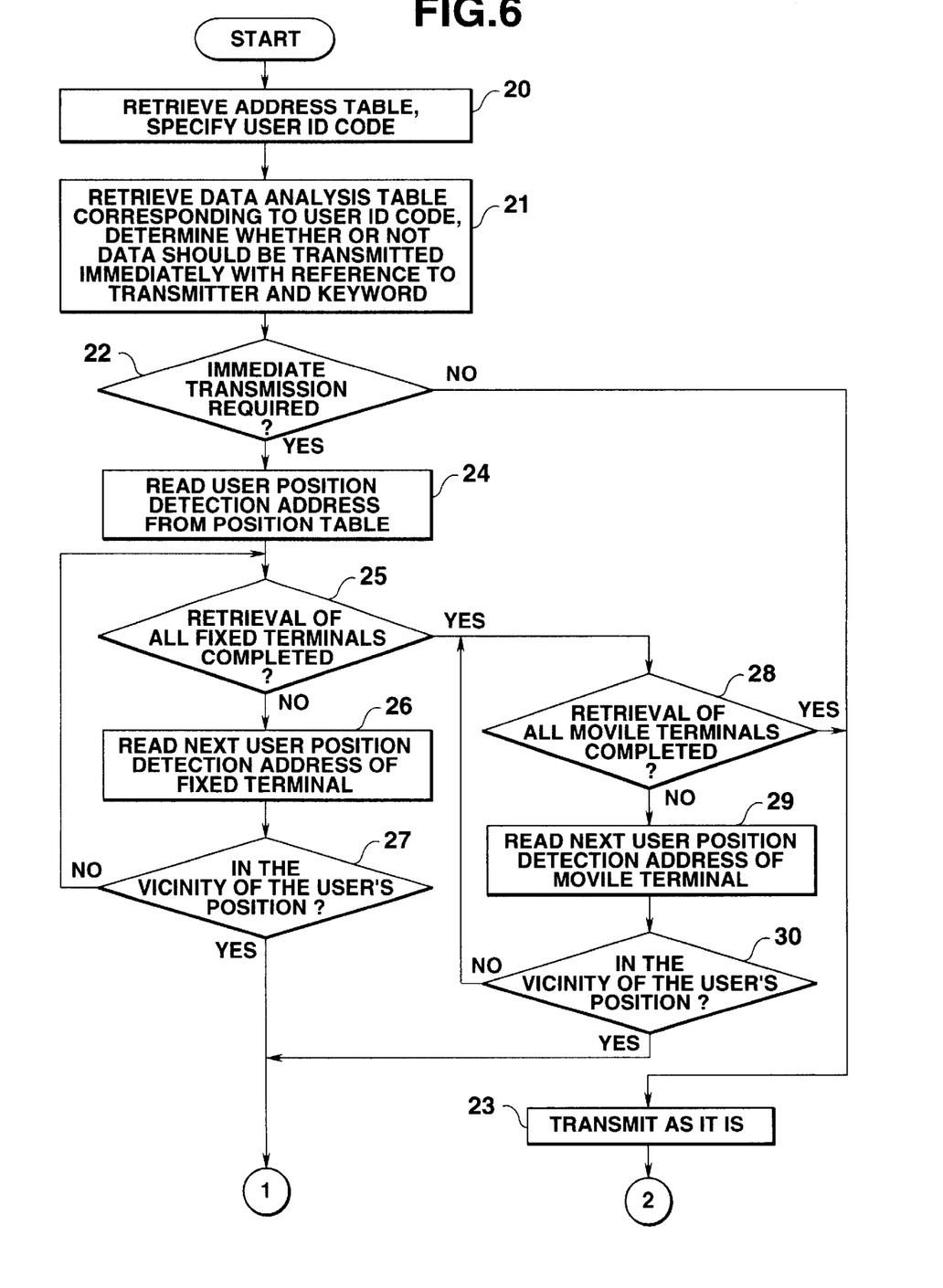
FIGS. 6 and 7 are flow charts for processing in the first embodiment.
Figure 7:
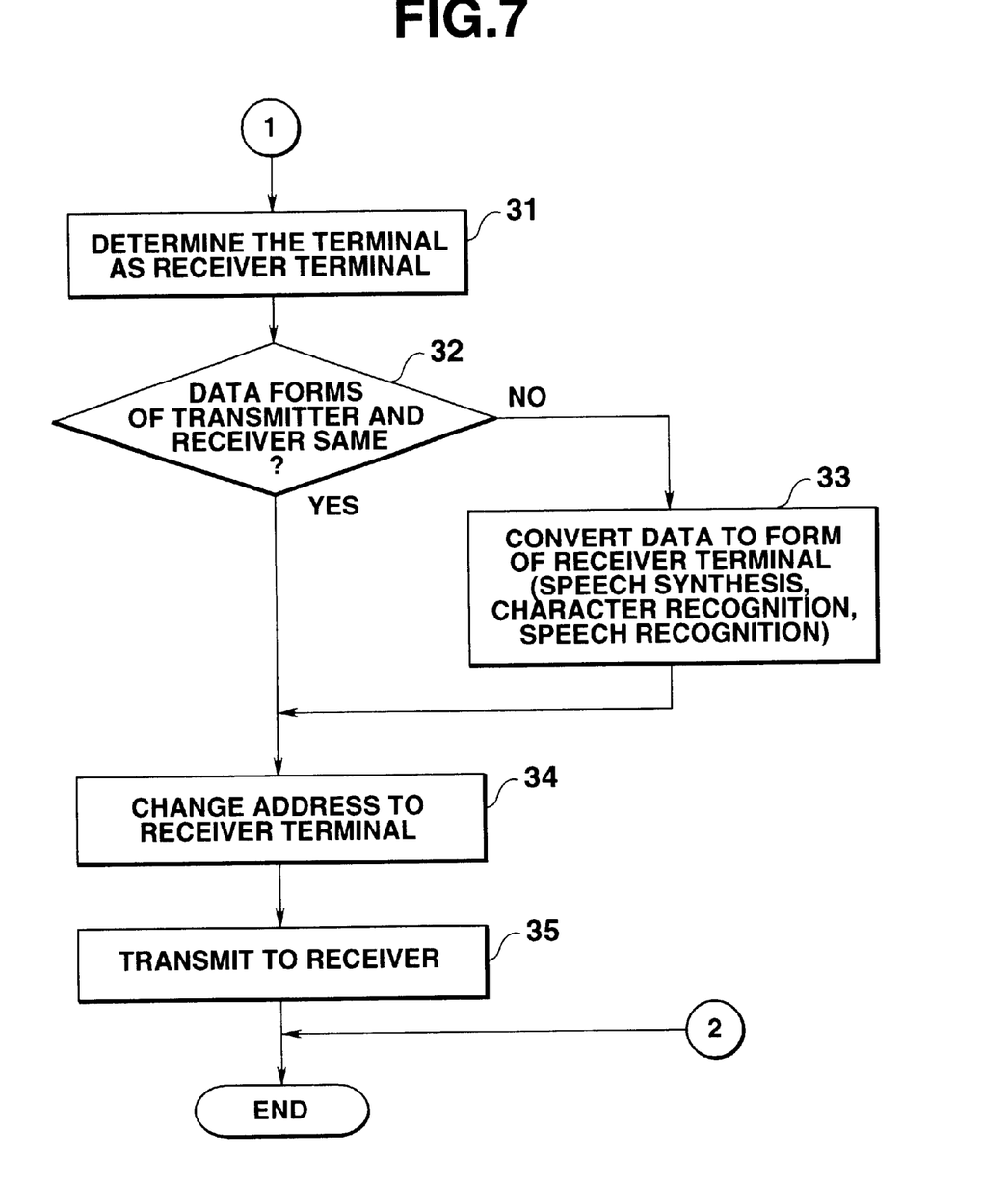

FIGS. 6 and 7 is a flow chart for processing in the case where three tables (the address table 10, position table and data analysis table 12) are all used.

In the figure, when a transmission event of data has occurred, the address table 10 is subjected to retrieval and a user identification code (identification data of a specific individual) is specified (step 20). Then, the data analysis table 12 is subjected to retrieval and a transmitter corresponding to the user identification code, a keyword of an data text are selected (step 21) and it is determined whether or not the transmission event includes the selected transmitter or keyword or it is determined whether or not the immediate transmission is required (step 22).

When no immediate transmission is required, the data is transmitted to a receiver device which has been sent from a transmitter in the same data form as received (step 23) or the transmission is suspended. When it is determined that the data is in need for immediate transmission, the data should be transmitted to a terminal located in the vicinity of the specific individual. Therefore, a position detection address of a user is read from the position table 11 and a detection signal is transmitted to a position search terminal which is carried by the user at the position detection address. Data on the present position of the user is obtained from a response signal to the transmitted detection signal and the data of the present position is stored (step 24). Further, position detection addresses of terminals which the user may use are read from the position table 11, position data of the terminals are sequentially selected using the position detection addresses and stored (steps 25 to 30). In parallel to these steps, the position data of the terminals are compared with the position data of the user and a terminal which is located in the vicinity of the user is specified (steps 27, 30).

When the terminal which is located in the vicinity of the user is not found, the same processing as that performed when immediate transmission is not in need is performed (step 23).

In step 27 or step 30, when a terminal in the vicinity of the user has been found, the found terminal is determined as a receiver address (step 31). The position table 11 is referred to and a data form of the terminal is specified. It is determined whether or not a data form of the receiver terminal is same as the subject data to be transmitted (step 32). If the data forms are not same as each other, conversion processing of the form of the data is performed so as to be fitted for the data form of the receiver terminal (step 33).

For example, in conversion from a mail or Web to a telephone, speech synthesis processing is applied, in conversion from FAX to a mail or Web, character recognition processing is applied, in conversion from FAX to a telephone, character recognition processing and then speech synthesis processing are applied, and in conversion from a telephone to a mail, FAX or Web, speech recognition processing is applied.

Finally, the original receiver address is changed to the receiver terminal address in the vicinity of the user (step 34) and then the data is transmitted to the terminal (step 35), whereby the processing is terminated.

As described above, according to a processing flow of FIGS. 6 and 7, it is possible that a terminal which is located in the vicinity of a specific individual is selected and then data is transmitted to the selected terminal. Therefore, immediate accessibility of transmission can be secured. Further, a selecting operation for immediate access is restricted only to data with urgency, efficiency of the system is increased with no waste in the processing. When data forms of a transmitter and a receiver are different from each other, the data form of the transmitter is converted to that of the receiver so as to be in coincidence. Therefore, an advantageous effect that various kinds of terminals can be used in an effective way can be realized.

While in the above described embodiment, position data of a user is detected after a transmission event occurs, the position data may regularly be detected and a result of the detection may be stored. Position data of a terminal is, in a similar way to the case of a user position data, regularly detected and the data may be kept stored. In these cases, processing of position detection of a user and/or processing of position detection of a terminal is not necessary in the flow chart of FIGS. 6 and 7 and processing till transmission can be shortened.

Other embodiments of the data transmission device according to the present invention will be described. The same portions as those of the first embodiment will be indicated in the same reference numerals and their detailed description will be omitted.

Second Embodiment

Figure 8:
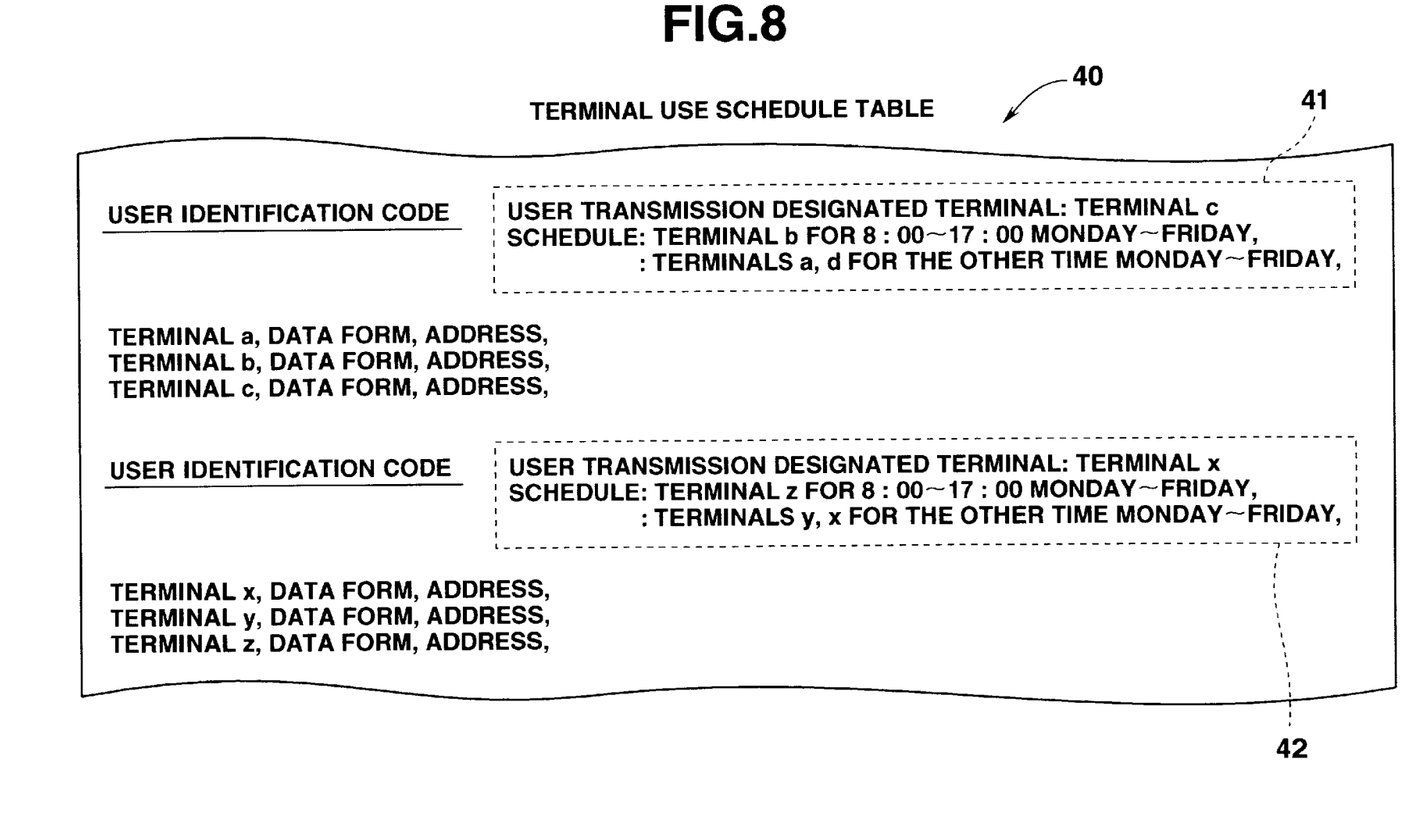
FIG. 8 is a representation of a structure of a terminal use schedule table.

FIG. 8 is a representation showing a structure of a terminal use schedule table 40 which can be used instead of the position table 11 of the first embodiment. An overall configuration of the system and a schematic structure of a data transmission device in the embodiment are properly referred to FIGS. 1 and 2 in description below.

As shown in FIG. 8, a terminal use schedule table 40 comprises not only a plurality of records for respective users but fields for all terminals which can be used by each user. While the embodiment is in common with the position table 11 of the first embodiment in this respect, the embodiment is different from the position table 11 in that, in the embodiment, the terminal use schedule table 40 has no sub-fields for storing position detection address and position data of respective users and terminals but a sub-field for storing terminal use schedules of respective users.

That is, in the terminal use schedule 40 shown in FIG. 8, terminal use schedule is indicated as shown in a broken box 41 "a terminal c as a terminal for use in default by the user, a terminal b as a device for use by the user in time zones of 8 O'clock to 17 O'clock Monday through Friday, and terminals a and d as terminals for use by the user in time zones of the other time Monday through Friday". Terminal use schedule for another user is indicated as shown in a broken box 42 "a terminal x as a terminal for use in default by the user, a terminal z as a device for use by the user in time zones of 9 O'clock to 19 O'clock Monday through Friday, and terminals y and x as terminals for use by the user in time zones of the other time Monday through Friday". While a plurality of device names are designated in the same schedule, it means that transmission to the plurality of devices designated by the device names is possible and the device names are recited in the order of priority in transmission. The terminal use schedule table 40 can be called by a user's terminal by designation by the user and the user can freely correct, add or delete the table. As an alternate, items to be corrected, added or deleted in the tables are transmitted to the center by a mail or the like for rewriting.

Figure 9:
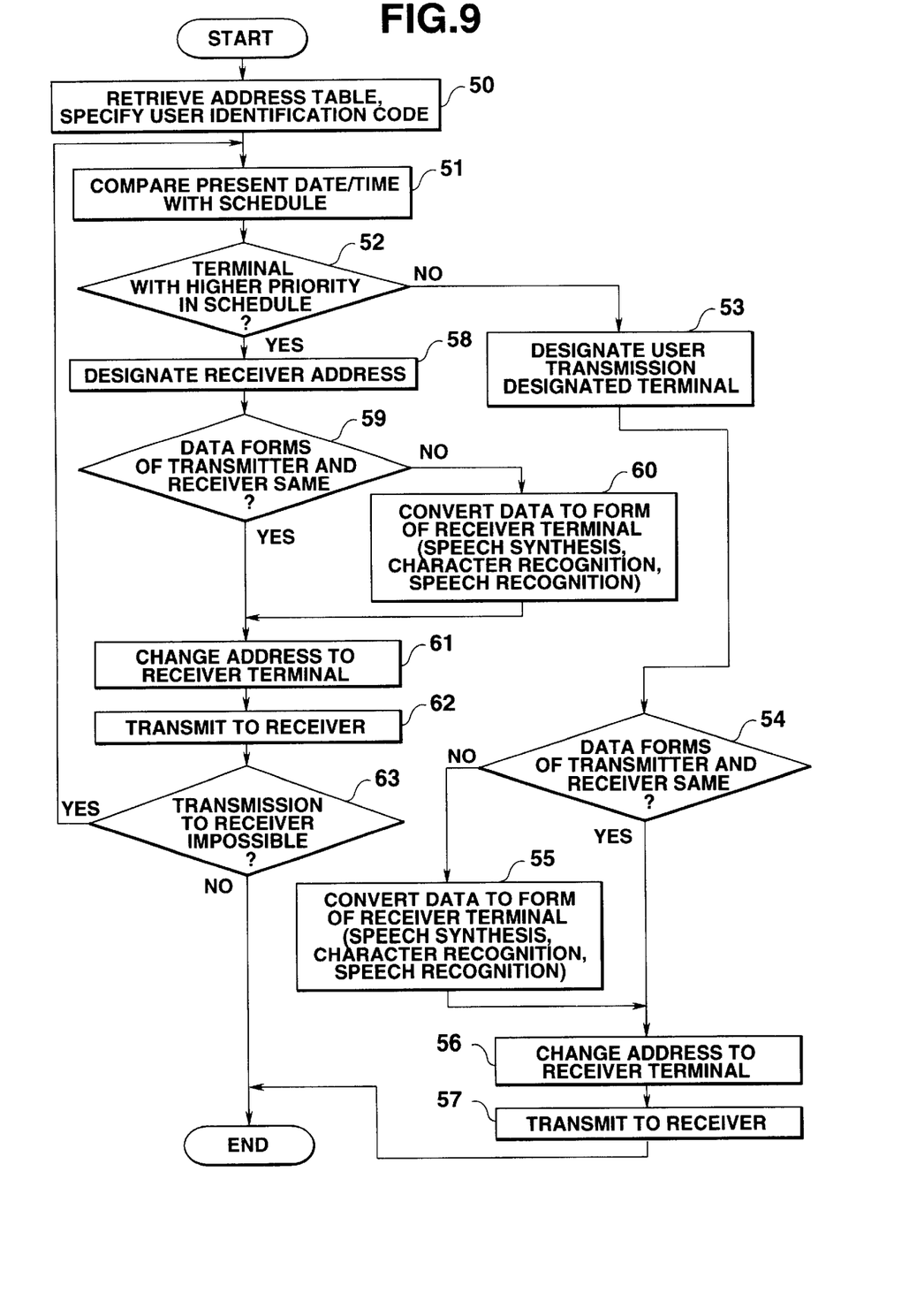
FIG. 9 is a flow chart for processing in the second embodiment.

FIG. 9 is a processing flow in the case where the address table 10 of the first embodiment and the terminal use schedule table 40 of the embodiment are used.

When a transmission event of data occurs, the address table 10 is referred to and a user identification code is specified (step 50) and then the terminal use schedule table 40 is subject to retrieval using the specified user identification code. Then, the terminal use schedule of the user is specified and it is determined whether or not there is a terminal which is scheduled to be used at the present date/time. When there is a plurality of use scheduled terminals, it is determined whether or not there is a terminal with a higher priority (steps 51 and 52).

When there is no use scheduled terminal, a terminal for default of the user is designated as a receiver of transmission (step 53). It is determined whether or not data forms of the transmitter and the receiver are same as each other (step 54). When the data forms are not same as each other, the data is subjected to conversion processing so as to adaptable to the data forms of the receiver terminal (step 55). Finally, an address of the data is changed to an address of the receiver terminal (a terminal for default) (step 56) and the data is transmitted to the address of the terminal (step 57).

On the other hand, in step 52 when there is a use scheduled terminal of the user, the use scheduled terminal is designated as a receiver terminal (step 58). It is determined whether or not data forms of a transmitter and a receiver are same as each other (step 59). If the data forms are not same as each other, the data is subjected to conversion processing to be fitted for the data forms of the receiver terminal (step 60). Finally, an address of the data is changed to an address of the receiver terminal (the use scheduled terminal) (step 61) and the data is transmitted to the address of the terminal (step 62).

When the use scheduled terminal cannot be used for transmission due to being already in use or line failure, program flow returns to step 51. In this case, it is necessary that a flag or the like is set to a terminal which cannot be used so that the terminal is not selected.

As described above, according to the embodiment, since selection of a receiver terminal is performed using a table in which a schedule of a terminal to be used by a specific individual is stored, a special effect that there is no necessity of a position detector being provided as in the first embodiment and thereby simplification of the system can be obtained.

While in the above described embodiments, application to the facsimile terminal 2 connected to the telephone line network 1 has been exemplified, there is no specific limitation to this application. Not only may the telephone line network 1 be read as LAN or WAN but the facsimile terminal may also be read as a work station or a portable data terminal.

While main functions (the address table 10 of FIG. 3, the position table 11 of FIG. 4, the data analysis table 12 of FIG. 5, the processing flow of FIGS. 6 and 7, a terminal use schedule table 40 of FIG. 8, the processing table of FIG. 9 and the like) are naturally realized by a hard logic, it is desired that the main functions are realized by a software, if efficiency of development and the like is considered. In this case, it is only necessary to provide a computer readable storage medium (a floppy disk, MO, CD, a hard disk, a semiconductor memory or the like) on which a computer program for realization of the main functions is stored. When the program is installed in a computer which is equipped with Ethernet card, a modem, a terminal adapter or the like and executed, operations and effects of the above described embodiments can be obtained.

According to the present invention, when a transmission event of data occurs, position data table of terminals, which the specific individual has a possibility to use, on a network is searched to extract the position data which coincides with or is the closest to the position of the specific individual at a present time or at an arbitrary time point in a given time period including the present time. The data is transmitted to a terminal corresponding to the extracted position data. Therefore, data can be transmitted to a terminal which is located in the vicinity of a specific individual and immediate accessibility of data transmission can thereby be improved.

Position data of a specific individual and position data of a terminal are updated. Therefore, movements of a specific individual and a terminal can correctly be grasped and selection errors of receiver addresses of data can be reduced.

Only urgent data can be transmitted to a predetermined terminal, which entails increase in efficiency of the system.

Only urgent data can be transmitted to a terminal in the vicinity of a specific individual and thereby, useless selection processing for a terminal can be eliminated.

A receiver terminal of data directed to a specific individual can be selected based on a terminal use schedule for the specific individual. Therefore, there is no need to attain position data of a specific individual and a terminal, which enables simplification of the system to be realized.

When a receiver terminal cannot be used, the receiver terminal can be switched to another receiver terminal, which enables certainty of data transmission to be secured.

A difference in data form between a transmitter and a receiver can be absorbed, which enables an effective use of a terminal to be realized.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data transmission device which transmits data to a predetermined individual via a network, comprising:
    first storage means for storing individual position data indicating a position of the predetermined individual at a present time or at an arbitrary time point in a given time period including the present time;
    second storage means for storing terminal position data of terminals on the network, each of which the predetermined individual has a possibility to use;
    means for extracting such terminal position data from said second storage means that coincides with or is the closest to the individual position data stored in said first storage means;
    means for selecting a terminal having the extracted terminal position data; and
    transmitting means for transmitting data to the terminal selected by said selecting means.

2. The data transmission device according to claim 1, further comprising:
    first updating means for requesting transmission of individual position data from a first position detector which the specific individual has and updating the individual position data stored in said first storage means based on the individual position data transmitted from the first position detector; and
    second updating means for requesting transmission of terminal position data from second position detectors attached to all the terminals, each of which the specific individual has a possibility to use, on the network, and updating the terminal position data stored in said second storage means based on the terminal position data transmitted from the second position detectors.

3. The data transmission device according to claim 1, in which said transmitting means comprises:
    means for comparing a data form of transmitting data and a data form which can be processed by the selected terminal; and
    means for converting the data form of the transmitting data into a data form which can be processed by the selected terminal when said comparing means detects noncoincidence.

4. A data transmission device which transmits data to a specific individual via a network, comprising:
    first means for determining whether a transmitter of the data is a predetermined transmitter;
    second means for determining whether a predetermined keyword is included in the data;
    means for transmitting the data to a predetermined terminal on the network when said first means determines that the transmitter of the data is the predetermined transmitter or when said second means determines that the predetermined keyword is included in the data;
    first storage means for storing individual position data indicating a position of the specific individual at a present time or at an arbitrary time point in a given time period including the present time;
    second storage means for storing terminal position data of all terminals on the network, each of which the specific individual has a possibility to use;
    selecting means for selecting a terminal of which terminal position data coincides with or is the closest to the individual position data stored in said first storage means; and
    transmitting means for transmitting data to the terminal selected by said selecting means.

5. A data transmission device which transmits data to a specific individual via a network, comprising:
    first means for determining whether a transmitter of the data is a predetermined transmitter;
    second means for determining whether a predetermined keyword is included in the data; and
    means for transmitting the data to a predetermined terminal on the network when said first means determines that the transmitter of the data is the predetermined transmitter or when said second means determines that the predetermined keyword is included in the data;
    wherein said transmitting means comprises:
        means for comparing a data form of transmitting data and a data form which can be processed by the selected terminal; and
        means for converting the data form of the transmitting data into a data form which can be processed by the selected terminal when said comparing means detects noncoincidence.

6. A data transmission device which transmits data to a specific individual via a network, comprising:
    storage means for storing use schedules of all terminals on the network, each of which the specific individual has a possibility to use;
    selecting means for selecting a terminal which is assumed to be used by the specific individual with reference to the use schedules stored in said storage means when a transmission event is occurs;
    transmitting means for transmitting data to the terminal selected by said selecting means;
    wherein said transmitting means comprises:
        means for comparing a data form of transmitting data and a data form which can be processed by the selected terminal; and
        means for converting the data form of the transmitting data into a data form which can be processed by the selected terminal when said comparing means detects noncoincidence.

7. A computer readable program comprising:
    program code for storing individual position data indicating a position of the predetermined individual at a present time or at an arbitrary time point in a given time period including the present time to first storage means;

program code for storing terminal position data of terminals on the network to second storage means, each of which the predetermined individual has a possibility to use;

program code for extracting such terminal position data from said second storage means that coincides with or is the closest to the individual position data stored in said first storage means;

program code for selecting a terminal having the extracted terminal position data; and program code for transmitting data to the selected terminal.

8. The computer program according to claim 7, in which said program further comprises:

program code for requesting transmission of individual position data from a first position detector which the specific individual has and updating the individual position data stored in said first storage means based on the individual position data transmitted from the first position detector; and program code for requesting transmission of terminal position data from second position detectors attached to all the terminals, each of which the specific individual has a possibility to use, on the network, and updating the terminal position data stored in said second storage means based on the terminal position data transmitted from the second position detectors.

9. A computer readable program comprising:

program code for determining whether a transmitter of data is a predetermined transmitter;

program code for determining whether a predetermined keyword is included in the data;

program code for transmitting the data to a predetermined terminal on the network when it is determined that the transmitter of the data is the predetermined transmitter or when it is determined that the predetermined keyword is included in the data;

program code for storing individual position data indicating a position of the specific individual at a present time or at an arbitrary time point in a given time period including the present time into first storage means;

program code for storing terminal position data of all terminals on the network, each of which the specific individual has a possibility to use into second storage means;

program code for selecting a terminal of which terminal position data coincides with or is the closest to the individual position data stored in said first storage means; and program code for transmitting data to the selected terminal.

* * * * *